US011269209B2

(12) United States Patent
Chiu et al.

(10) Patent No.: US 11,269,209 B2
(45) Date of Patent: Mar. 8, 2022

(54) ELECTRONIC DEVICE AND METHOD FOR MANUFACTURING THE SAME

(71) Applicant: InnoLux Corporation, Miao-Li County (TW)

(72) Inventors: Liang-Yun Chiu, Miao-Li County (TW); Tsung-Han Tsai, Miao-Li County (TW); Yuan-Lin Wu, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 17/243,805

(22) Filed: Apr. 29, 2021

(65) Prior Publication Data

US 2021/0247639 A1    Aug. 12, 2021

Related U.S. Application Data

(63) Continuation of application No. 16/108,329, filed on Aug. 22, 2018, now abandoned.

(51) Int. Cl.
*G02F 1/1333* (2006.01)
*G02F 1/1337* (2006.01)

(52) U.S. Cl.
CPC ........ *G02F 1/13336* (2013.01); *G02F 1/1337* (2013.01); *G02F 1/133308* (2013.01)

(58) Field of Classification Search
CPC .................................................. G02F 1/13336
See application file for complete search history.

(56) References Cited

U.S. PATENT DOCUMENTS

| 9,488,857 | B2 | 11/2016 | Bornstein et al. | |
|---|---|---|---|---|
| 2019/0067630 | A1* | 2/2019 | Hwang | H01L 51/5246 |
| 2019/0258096 | A1* | 8/2019 | Chien | G02F 1/1333 |

FOREIGN PATENT DOCUMENTS

| CN | 104090405 A | 10/2014 |
|---|---|---|
| CN | 106536439 A | 3/2017 |

OTHER PUBLICATIONS

Chinese language office action dated Nov. 3, 2021, issued in application No. CN 201910288345.4.

* cited by examiner

*Primary Examiner* — Sang V Nguyen
(74) *Attorney, Agent, or Firm* — McClure, Qualey & Rodack, LLP (57) ABSTRACT

An electronic device is provided. The electronic device includes a first substrate, a second substrate, a third substrate and a fourth substrate. The first substrate includes a first portion. The second substrate is disposed on the first substrate, and the first portion protrudes outward a boundary of the second substrate. The third substrate is disposed adjacent to the first substrate. The fourth substrate is disposed on the third substrate and includes a second portion protruding outward a boundary of the third substrate. The second portion overlaps the first portion. The first substrate includes a first side surface facing the third substrate. The fourth substrate includes a second side surface facing the second substrate. The first side surface and the second side surface are at least partially grinded.

20 Claims, 8 Drawing Sheets

ELECTRONIC DEVICE AND METHOD FOR MANUFACTURING THE SAME

CROSS REFERENCE TO RELATED APPLICATIONS

This application is a Continuation of pending U.S. patent application Ser. No. 16/108,329, filed Aug. 22, 2018 and entitled "ELECTRONIC DEVICE AND METHOD FOR MANUFACTURING THE SAME".

BACKGROUND

Technical Field

The present disclosure relates to an electronic device and the method for manufacturing the electronic device, and in particular relates to the processing of the substrate of the electronic device.

Description of the Related Art

Liquid-crystal molecules are widely used in various electronic devices. In recent years, liquid-crystal molecules apply in display devices or tunable microwave devices, such as liquid-crystal display devices or antenna devices. The display device and the antenna device can work by controlling the directions of the liquid-crystal molecules for modulating the phase or amplitude of light, or microwave signal emitting from the display device.

Liquid-crystal molecules are generally disposed between two substrates of electronic devices. The substrates are often different in size, and some portions (e.g., the side portions) of the substrates protrude one another. The substrates usually have some defects or cracks on the side portions due to cutting or pre-cutting processes of the substrates. Therefore, the exposure of these weak portions may increase the risk of the substrates breaking. In addition, in some cases where the substrates are tiled together (e.g., in a tiled display device), the collision or contact between the side portions of the substrates may also result in damage to the substrates.

Accordingly, it is desirable to develop a way for processing the side portions of the substrates to enhance the structural strength of the substrates in electronic devices.

SUMMARY

In accordance with some embodiments of the present disclosure, an electronic device is provided. The electronic device includes a first substrate, a second substrate, a third substrate and a fourth substrate. The first substrate includes a first portion. The second substrate is disposed on the first substrate. The first portion protrudes outward a boundary of the second substrate in a direction perpendicular to a normal direction of the first substrate. The third substrate is disposed adjacent to the first substrate. The fourth substrate is disposed on the third substrate and includes a second portion. The second portion protrudes outward a boundary of the third substrate in a direction perpendicular to a normal direction of the third substrate. The second portion overlaps the first portion. The first substrate includes a first side surface. The first side surface faces to the third substrate and extends along a boundary of a top surface of the first substrate and a boundary of a bottom surface of the first substrate. The first side surface is not parallel to the top surface and the bottom surface. The fourth substrate includes a second side surface. The second side surface faces the second substrate and extends along a boundary of a top surface of the fourth substrate and a boundary of a bottom surface of the fourth substrate. The second side surface is not parallel to the top surface and the bottom surface. In addition, the first side surface and the second side surface are at least partially grinded.

In accordance with some embodiments of the present disclosure, a method for manufacturing an electronic device is provided. The method includes the following steps: providing a first substrate, the first substrate comprising a first portion; forming a second substrate on the first substrate, wherein the first portion protrudes outward a boundary of the second substrate in a direction perpendicular to a normal direction of the first substrate; providing a third substrate adjacent to the first substrate; forming a fourth substrate on the third substrate, the fourth substrate comprising a second portion protruding outward a boundary of the third substrate in a direction perpendicular to a normal direction of the third substrate, wherein the second portion overlaps the first portion; and at least partially grinding the first side surface and the second side surface. In addition, the first substrate includes a first side surface. The first side surface faces the third substrate and extends along a boundary of a top surface of the first substrate and a boundary of a bottom surface of the first substrate. The first side surface is not parallel to the top surface and the bottom surface. The fourth substrate includes a second side surface. The second side surface faces the second substrate and extends along a boundary of a top surface of the fourth substrate and a boundary of a bottom surface of the fourth substrate. The second side surface is not parallel to the top surface and the bottom surface.

A detailed description is given in the following embodiments with reference to the accompanying drawings.

BRIEF DESCRIPTION OF THE DRAWINGS

The disclosure may be more fully understood by reading the subsequent detailed description and examples with references made to the accompanying drawings, wherein.

DETAILED DESCRIPTION

The electronic device of the present disclosure and the manufacturing method thereof are described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the concept of the present disclosure may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. In addition, in this specification, expressions such as "first layer disposed on/over a second layer", may indicate the direct contact of the first layer and the second layer, or it may indicate a non-contact state with one or more intermediate layers between the first layer and the second layer. In the above situation, the first layer may not be in direct contact with the second layer.

It should be noted that the elements or devices in the drawings of the present disclosure may be present in any form or configuration known to those with ordinary skill in the art. In addition, the expressions "a layer overlying another layer", "a layer is disposed above another layer", "a layer is disposed on another layer" and "a layer is disposed over another layer" may indicate that the layer is in direct contact with the other layer, or that the layer is not in direct contact with the other layer, there being one or more intermediate layers disposed between the layer and the other layer.

In addition, in this specification, relative expressions are used. For example, "lower", "bottom", "higher" or "top" are used to describe the position of one element relative to another. It should be appreciated that if a device is flipped upside down, an element that is "lower" will become an element that is "higher"

It should be understood that, although the terms first, second, third etc. may be used herein to describe various elements, components, regions, layers, portions and/or sections, these elements, components, regions, layers, portions and/or sections should not be limited by these terms. These terms are only used to distinguish one element, component, region, layer, portion or section from another element, component, region, layer or section. Thus, a first element, component, region, layer, portion or section discussed below could be termed a second element, component, region, layer, portion or section without departing from the teachings of the present disclosure.

It should be understood that this description of the exemplary embodiments is intended to be read in connection with the accompanying drawings, which are to be considered part of the entire written description. The drawings are not drawn to scale. In addition, structures and devices are shown schematically in order to simplify the drawing.

The terms "about" and "substantially" typically mean +/−5% of the stated value, more typically +/−3% of the stated value, more typically +/−2% of the stated value, more typically +/−1% of the stated value and even more typically +/−0.5% of the stated value. The stated value of the present disclosure is an approximate value. When there is no specific description, the stated value includes the meaning of "about" or "substantially".

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

In addition, in some embodiments of the present disclosure, terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

In addition, the term "side surface" is defined as an upright or sloping surface of a structure or object that is not the top principle surface or the bottom principle surface and generally having a thin and long area. The term "side surface" can also be referred as a lateral surface of a structure or object, as opposed to the top principle surface and bottom principle surface.

In accordance with some embodiments of the present disclosure, an electronic device may include, but is not limited to, a display device (including a touch display device), a communication device, or a sensing device. In accordance with some embodiments, the electronic device may be arranged in adjacency to form a tiled electronic device. Specifically, the display device may include, but is not limited to, a liquid-crystal display (LCD), an organic light-emitting diode (OLED) display, an inorganic light-emitting diode display (e.g. micro LED or mini LED) or a laser display. For example, the inorganic light-emitting diode (LED) display may include a quantum dots light-emitting diode (QLED) display. In accordance with some embodiments, the communication device may include a liquid-crystal molecule-modulating device such as an antenna device.

In accordance with some embodiments of the present disclosure, an electronic device includes a substrate comprising at least one side surface that is partially processed. More specifically, the side surfaces of the substrate that are not overlaid by the opposite substrate are mostly processed. That is, most of the side surfaces protruding outward the boundary of the opposite substrate are processed. The processing may prevent defects or cracks on the side surfaces of the substrate due to the cutting process, pre-cutting process or other manufacturing processes from breaking. Therefore, the structural strength of the substrate and yield may be enhanced. In addition, the partial processing of the side surfaces of the substrate may also reduce the cost of manufacture. In accordance with some embodiments where the substrates with partially processed side surfaces are tiled together, the risk of breaking due to collision or contact between the substrates may be reduced.

Figure 1A:
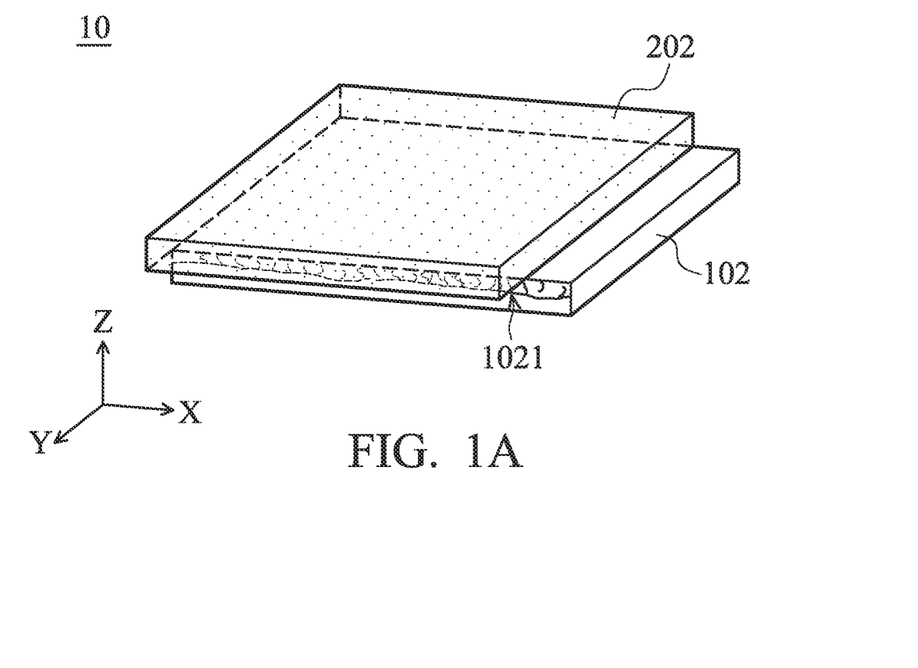
FIG. 1A is a diagram of the substrates of an electronic device in accordance with some embodiments of the present disclosure.
Figure 1B:
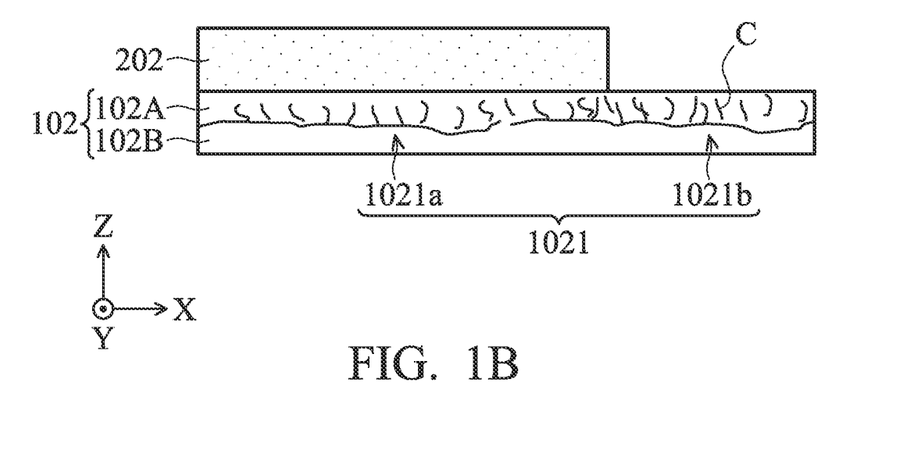
FIG. 1B is a side-view diagram of the substrates of an electronic device in accordance with some embodiments of the present disclosure.

FIG. 1A is a diagram of the substrates of an electronic device 10 in accordance with some embodiments of the present disclosure. FIG. 1B is a side-view diagram of the substrates of the electronic device 10 (i.e. in the X-Z plane) in accordance with some embodiments of the present disclosure. It should be understood that additional features may be added to the electronic device in accordance with some embodiments of the present disclosure. In addition, some of the features illustrated in the figures may be simplified or omitted for clarity.

Referring to FIG. 1A and FIG. 1B, the electronic device 10 includes a first substrate 102 having a top surface T and a bottom surface B, and a second substrate 202 disposed opposite to the first substrate 102 and laminated to each other. The first substrate 102 includes a first side surface 1021, and a portion of the first side surface 1021 protrudes outside the boundary (side surfaces) of the second substrate 202 in the perspective of normal direction of the substrate. In addition, the first side surface 1021 includes a first portion 1021a and a second portion 1021b. The second substrate 202 overlies the first portion 1021a but does not overlie the second portion 1021b. Part of the first substrate 102 protruding outward the boundary of the second substrate 202 includes the second portion 1021b. In some embodiments, some components of the electronic device 10 may be disposed corresponding to the protruding part of the first substrate 102. For example, the integrated circuit (IC) or other functional circuits, or mechanical components may be disposed corresponding to the second portion 1021b in accordance with some embodiments. In some other embodiments, the protruding part of the first substrate 102 may serve as a connecting area for the assembly to form a tiled electronic device.

In accordance with some embodiments, the first substrate 102 and the second substrate 202 are formed of materials having hardness in a range from about 2H to about 10H. In some embodiments, the first substrate 102 and the second substrate 202 may include, but is not limited to, glass, quartz, silicon, sapphire, glass fibers, ceramic, or a combination thereof. In some embodiments, the first substrate 102 and the second substrate 202 are formed of the same material. In some other embodiments, the first substrate 102 and the second substrate 202 are formed of different materials.

In addition, as shown in FIG. 1A and FIG. 1B, the first substrate 102 may include defects C such as cracks on the first side surface 1021 in accordance with some embodiments. The defects C may be generated during the pre-cutting process of the first substrate 102. As shown in FIG. 1B, in accordance with some embodiments, the first side surface 1021 of the first substrate 102 may include a first area 102A above and a second area 102B below, and the first area 102A may include more defects C than the second area 102B. The different morphologies of the first area 102A and the second area 102B may result from the cutting process in combination of pre-cutting and the breaking (separating) by mechanical force. However, in accordance with some other embodiments, the first substrate 102 may have defects C that are distributed substantially uniformly on the first side surface 1021 (i.e. the first area 102A and the second area 102B do not obviously exist). In some embodiments, the second substrate 202 also includes defects C on the side surfaces (not illustrated). In some embodiments, the cutting process may be performed by using a cutting knife, laser, or a combination thereof, but it is not limited thereto. In addition, it should be understood that the first side surface 1021 of the first substrate 102 may have various types of defects C or morphologies depending on different types of cutting processes. It should be also understood that although only the defects C on the first side surface 1021 of the first substrate 102 are illustrated in the figures, the defects C may exist on more than one side surface or all the side surfaces of the first substrate 102 in accordance with some embodiments.

Figure 2A:
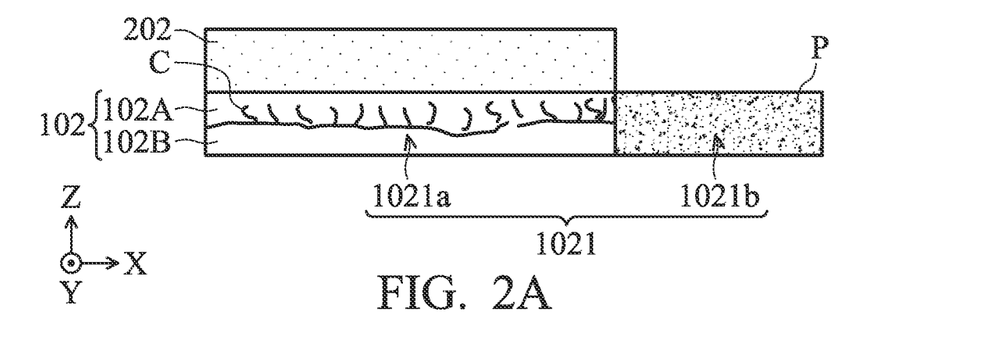
FIGS. 2A-2C are side-view diagrams of the substrates of the electronic devices in accordance with some embodiments of the present disclosure.

Referring to FIG. 2A, FIG. 2A is a side-view diagram of the substrates of the electronic device 10 (i.e. in the X-Z plane) in accordance with some other embodiments of the present disclosure. The first side surface 1021 of the first substrate 102 is partially processed. More specifically, the first portion 1021a of the first side surface 1021 is unprocessed and the second portion 1021b of the first side surface 1021 is processed to reduce or remove the defects C. As shown in FIG. 2A, the second portion 1021b that is not overlaid by the second substrate 202 has a processed region P while the first portion 1021a that is overlaid by the second substrate 202 does not have a processed region P, i.e. the first portion 1021a may still include the defects C. In other embodiments, the first portion 1021a of the first side surface 1021 still may be processed to reducing the defects C.

In accordance with some embodiments, the second portion 1021b is processed by a grinding process, a lapping process, a polishing process, a milling process, a coating process or a combination thereof. The component including abrasive particles may be used in the above grinding, lapping, polishing or milling process to modify the surface of the second portion 1021b. The component including abrasive particles may be moved along the Z direction, the Y direction, any other suitable direction or a combination thereof to process the second portion 1021b.

In embodiments where the second portion 1021b is processed, the surface roughness of the first portion 1021a is different from the surface roughness of the second portion 1021b. In some embodiments, the surface roughness of the first portion 1021a is greater than the surface roughness of the processed region P of the second portion 1021b.

On the other hand, in embodiments where the second portion 1021b is processed in a coating process, the second portion 1021b is coated with a protective material (not illustrated) to form the processed region P. The protective material may be coated on the second portion 1021b by dripping, pasting, spraying, stamping, any other applicable method, or a combination thereof. In some embodiments, the protective layer may include polyether thiourea, polyethylene terephthalate (PET), polydimethylsiloxane (PDMS), epoxy resins, polyepoxide, polymerized siloxanes, or a combination thereof, but is not limited thereto. In some embodiments, the protective layer may include a self-assembly monolayer.

In addition, it should be understood that in accordance with some embodiments, the second substrate 202 may include the side surface that is at least partially processed. In some embodiments, the second substrate 202 may include unprocessed side surface.

Figure 6:
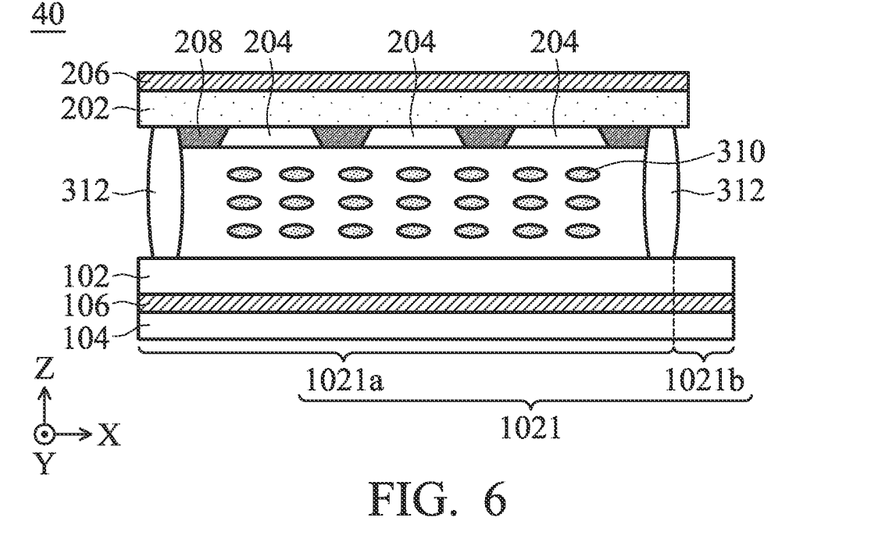
FIG. 6 illustrates a cross-sectional view of an electronic device in accordance with some embodiments of the present disclosure.
Figure 7:
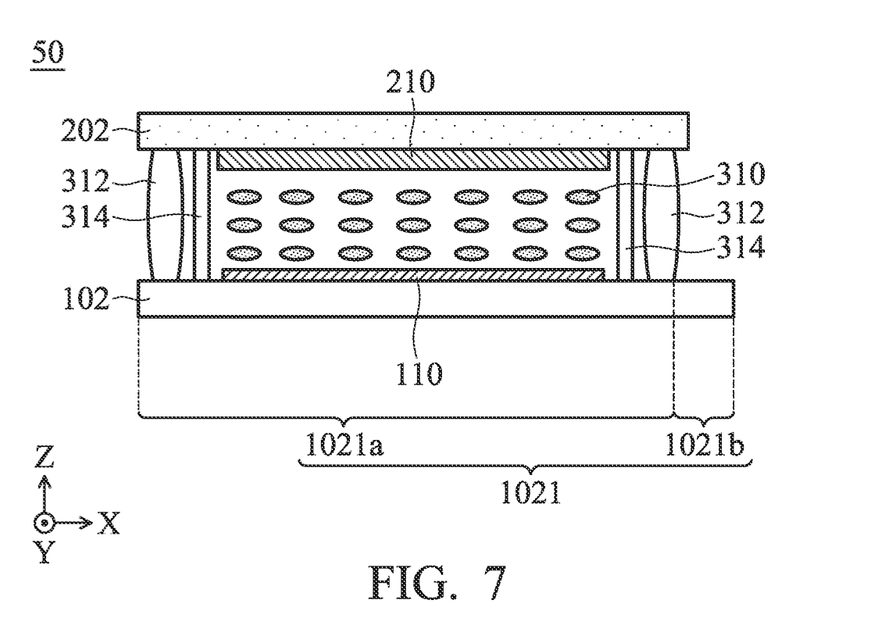
FIG. 7 illustrates a cross-sectional view of an electronic device in accordance with some embodiments of the present disclosure.

Furthermore, in accordance with some embodiments, the method for manufacturing the electronic device (e.g., the electronic device 10 shown in FIG. 2A) may include the following steps: providing the first substrate 102; forming the second substrate 202 on the first substrate 102; and processing the second portion 1021b of the first substrate 102 while leaving the first portion 1021a of the first substrate 102 unprocessed. In addition, the method may further include forming a liquid-crystal layer (e.g., as shown in FIGS. 6 and 7) between the first substrate 102 and the second substrate 202 in accordance with some embodiments.

Figure 2B:
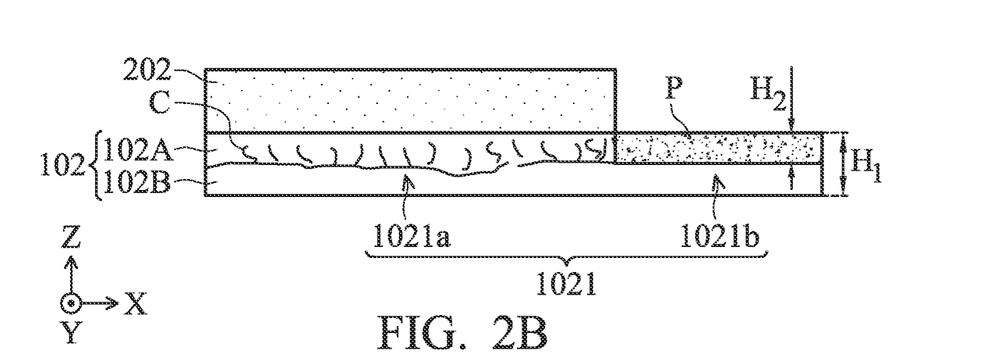

Next, referring to FIG. 2B, FIG. 2B is a side-view diagram of the substrates of the electronic device 10 (i.e. in the X-Z plane) in accordance with some other embodiments of the present disclosure. The difference between the embodiment shown in FIG. 2B and the embodiment shown in FIG. 2A is that the second portion 1021b of the first side surface 1021 is partially processed in the electronic device of FIG. 2B while the second portion 1021b of the first side surface 1021 is substantially entirely processed in the electronic device of FIG. 2A. In this embodiment, the first portion 1021a of the first side surface 1021 is entirely unprocessed. In some embodiments, the first side surface 1021 of the first substrate 102 has a maximum height $H_1$ (thickness) and the processed region P has a maximum height $H_2$. In some embodiments, the ratio of the maximum height $H_2$ to the maximum height $H_1$ ($H_2/H_1$) is in a range from about 0.1 to about 0.9 or from about 0.1 to about 0.5.

Figure 2C:
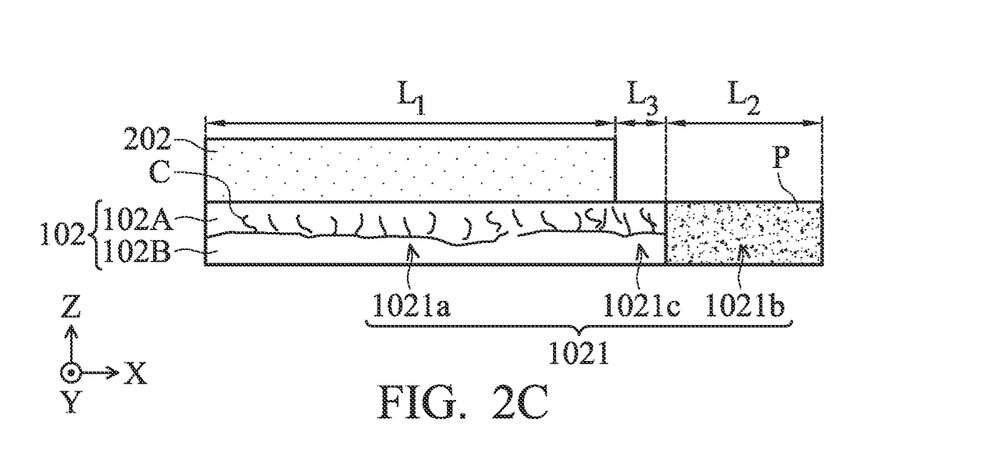

Referring to FIG. 2C, FIG. 2C is a side-view diagram of the substrates of the electronic device 10 (i.e. in the X-Z plane) in accordance with some other embodiments of the present disclosure. The difference between the embodiment shown in FIG. 2C and the embodiment shown in FIG. 2A is that the first side surface 1021 of the first substrate 102 further includes a third portion 1021c located between the first portion 1021a and the second portion 1021b in the embodiments shown in FIG. 2C. In addition, the third portion 1201c is not overlaid by the second substrate 202 and is unprocessed. The third portion 1201c may serve as a buffer region to prevent the processing of the second portion 1021b from affecting the second substrate 202.

In some embodiments, the first portion 1021a has a first length $L_1$ along the X direction and the second portion 1021b has a second length $L_2$ along the X direction. The first length $L_1$ is greater than the second length $L_2$ in accordance with some embodiments. In addition, the third portion 1201c has a third length $L_3$ along the X direction. In some embodiments, the second length $L_2$ is greater than the third length $L_3$. In some embodiments, the third length $L_3$ is in a range from about 0.5 mm to about 100 mm, or from about 1 mm to about 5 mm. In addition, the X direction mentioned above may be an extending direction of the first side surface 1021, i.e. the longitudinal direction of the first side surface 1021.

Next, referring to FIGS. 3A-3D, FIGS. 3A-3D are side-view diagrams of the substrates of the electronic device 10 (i.e. in the X-Z plane) in accordance with some other embodiments of the present disclosure. In accordance with some embodiments, the first substrate 102 includes an end 102e that is processed to have a certain shape. Specifically, the end 102e that is located at the edge of the second portion 1021b of the first side surface 1021 is processed.

Figure 3A:
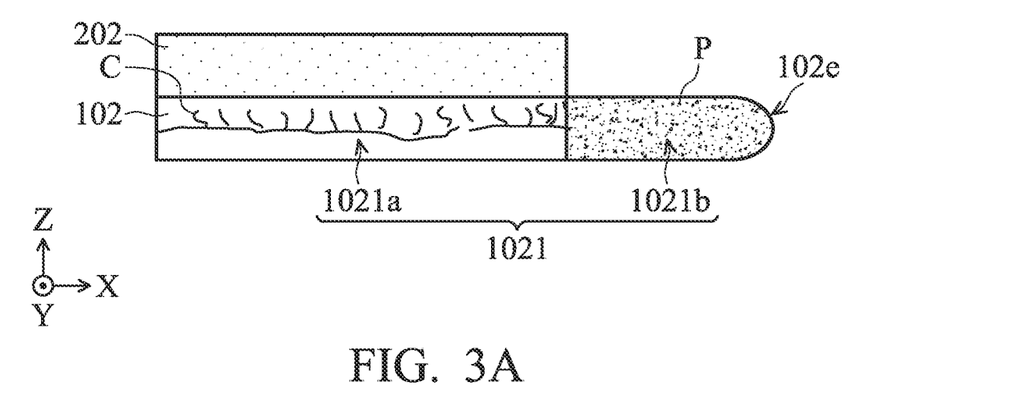
FIGS. 3A-3D are side-view diagram of the substrates of the electronic devices in accordance with some embodiments of the present disclosure.
Figure 3B:
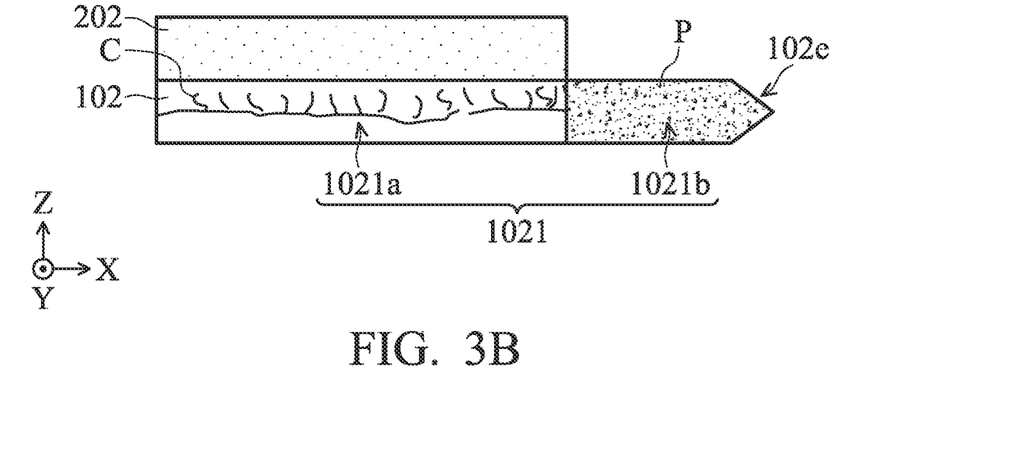
Figure 3C:
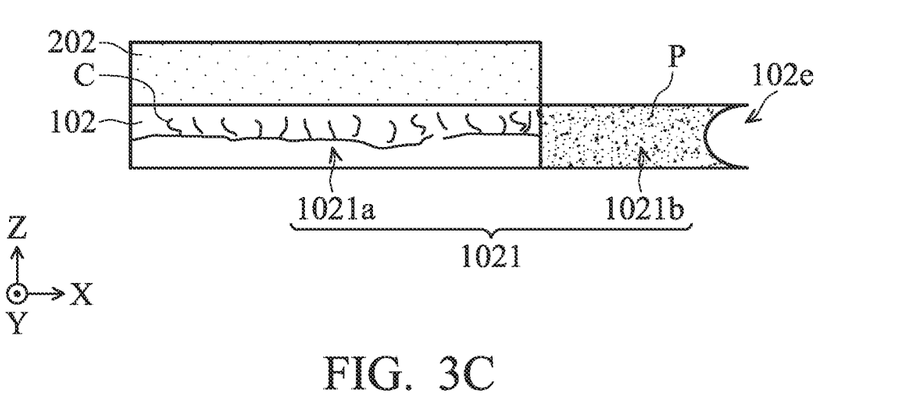
Figure 3D:
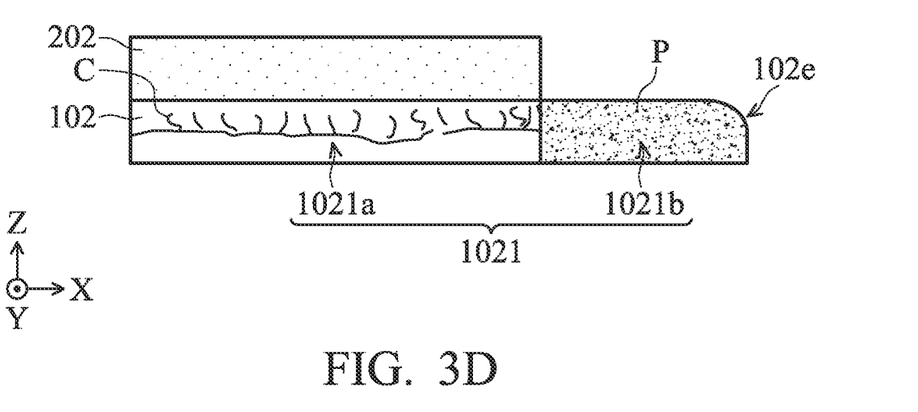

As shown in FIG. 3A, the end 102e of the first substrate 102 may have an arc shape or a rounded shape in accordance with some embodiments. As shown in FIG. 3B, the end 102e of the first substrate 102 may have a tapered shape or a sharp shape in accordance with some embodiments. As shown in FIG. 3C, the end 102e of the first substrate 102 may have a concave shape or a recessed shape in accordance with some embodiments. In addition, as shown in FIG. 3D, the end 102e of the first substrate 102 may have an obtuse shape in accordance with some embodiments. More specifically, in some embodiments, the upper region of the second portion 1021b is recessed or rounded whereas the lower portion of the second portion 1021b is not recessed. Alternatively, in some embodiments, the lower portion of the second portion 1021b is recessed or rounded whereas the upper portion of the second portion 1021b is not.

Figure 4A:
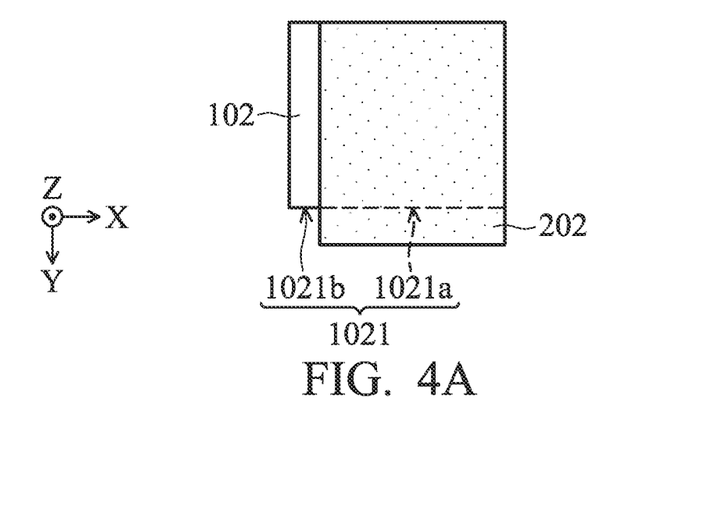
FIGS. 4A-4C are top-view diagrams of the substrates of the electronic devices in accordance with some other embodiments of the present disclosure.
Figure 4B:
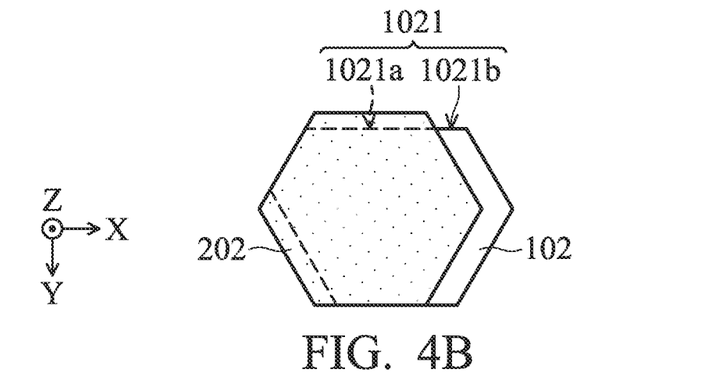
Figure 4C:
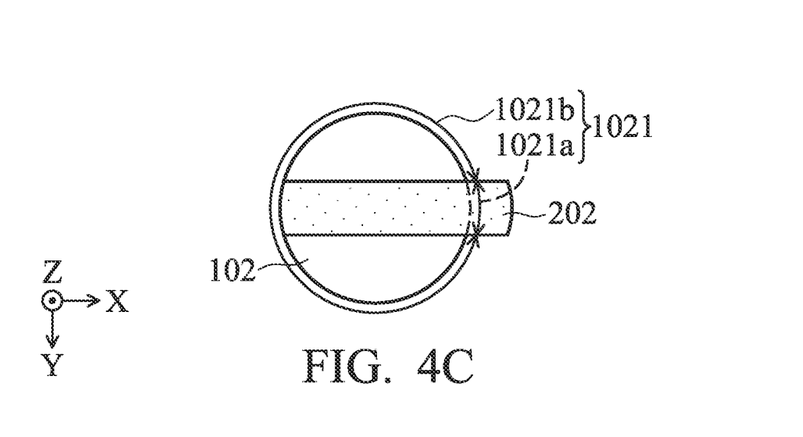

Next, referring to FIGS. 4A-4C, FIGS. 4A-4C are top-view diagrams of the substrates of the electronic devices in accordance with some other embodiments of the present disclosure. As shown in FIGS. 4A-4C, the first substrate 102 and the second substrate 202 have various aspects. For example, the first substrate 102 and the second substrate 202 may have similar shapes in accordance with some embodiments. Alternatively, the first substrate 102 and the second substrate 202 may have different shapes in accordance with some embodiments. The first substrate 102 and the second substrate 202 are misaligned. In some embodiments, parts of the side surfaces of the first substrate 102 protrude outward compared with the side surfaces (boundaries) of the second substrate 202. In some embodiments, parts of the side surfaces of the second substrate 202 protrude outward compared with the side surfaces of the first substrate 102. In some embodiments, parts of the side surfaces of the first substrate 102 align with the side surfaces of the second substrate 202.

Referring to FIG. 4A, in some embodiments, the first substrate 102 and the second substrate 202 may both have a rectangular shape. Referring to FIG. 4B, in some embodiments, the first substrate 102 and the second substrate 202 may both have a hexagonal shape. Referring to FIG. 4C, in some embodiments, the first substrate 102 may have a circular shape and the second substrate 202 may have an extending shape with curved ends. However, it should be understood that in accordance with some other embodiments, the first substrate 102 and the second substrate 202 may have a triangle shape, a pentagonal shape, an oblong shape, a diamond shape, an irregular shape or any other suitable shape according to needs. In addition, the first side surface 1021 of the first substrate 102 may be linear, curved, irregular or a combination thereof in accordance with some embodiments.

Figure 5A:
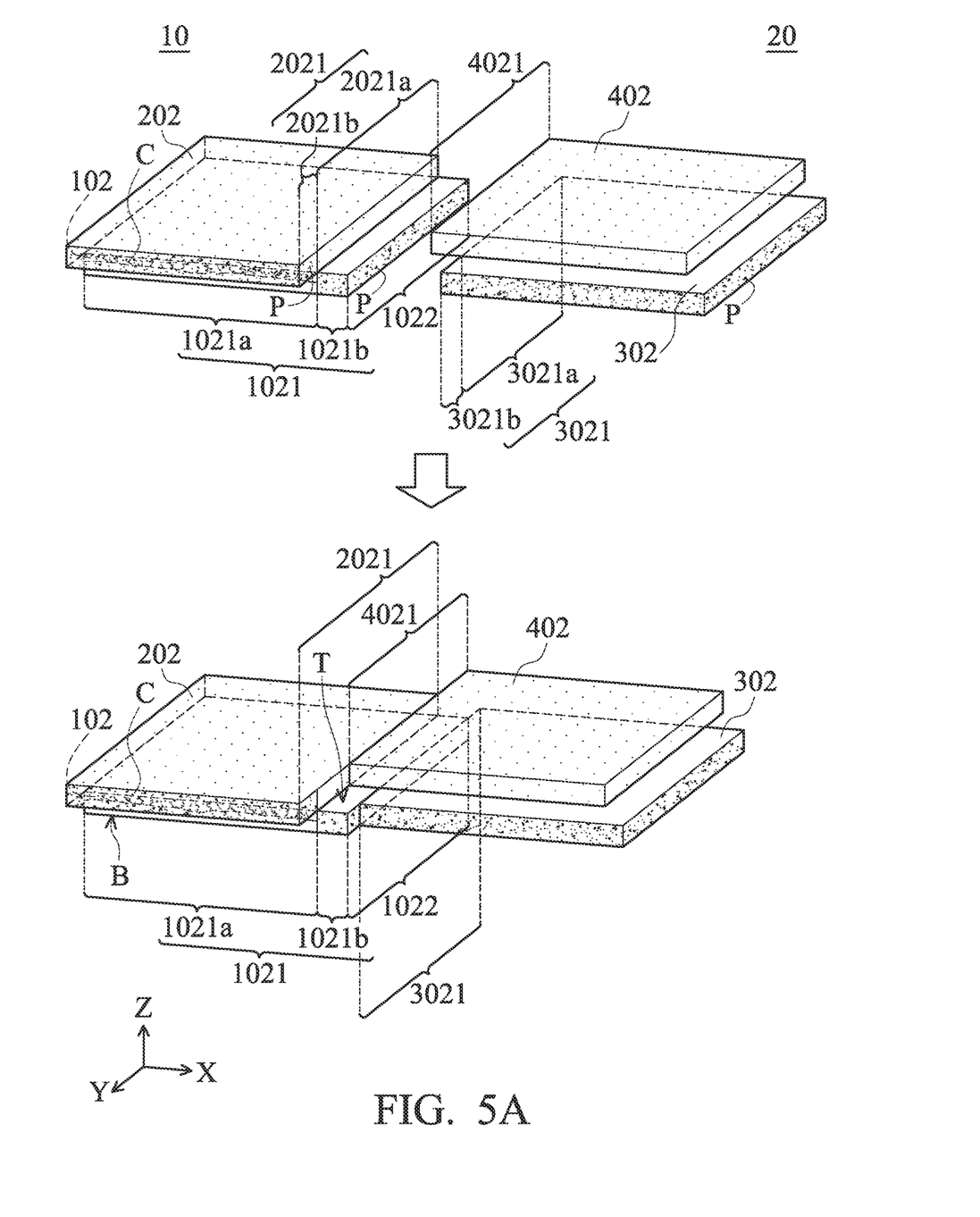
FIG. 5A is a diagram showing assembly of the substrates of a tiled electronic device in accordance with some embodiments of the present disclosure.

Next, referring to FIG. 5A, FIG. 5A is a diagram showing assembly of the substrates of a tiled electronic device in accordance with some embodiments of the present disclosure. In accordance with some embodiments, the electronic devices may be arranged with each other to form a tiled electronic device. For example, as shown in FIG. 5A, the electronic device 10 is assembled with the electronic device 20. In some embodiments, the electronic device 10 and the electronic device 20 are the same type of electronic device. In some embodiments, the electronic device 10 and the electronic device 20 are different types of electronic devices.

In some embodiments, the electronic device 20 has a structure that is similar to that of the electronic device 10. More specifically, the electronic device 20 includes a third substrate 302 and a fourth substrate 402 disposed on the third substrate 302. The third substrate 302 is disposed adjacent to the first substrate 102 and includes a third side surface 3021. The fourth substrate 402 is disposed adjacent to the second substrate 202 and includes a fourth side surface 4021. In addition, the fourth substrate 402 overlaps the first substrate 102 in accordance with some embodiments. More specifically, the fourth substrate 402 overlaps the second portion 1021b of the first substrate 102 in accordance with some embodiments.

As shown in FIG. 5A, the first substrate 102 further includes a second side surface 1022 that is not overlaid by the second substrate 202 in accordance with some embodiments. In some embodiments, the second side surface 1022 of the first substrate 102 is processed since the second side surface 1022 is not protected by the second substrate 202. In addition, the second substrate 202 may also include a second side surface 2021. The second side surface 2021 of the second substrate 202 includes a first portion 2021a that overlaps with first substrate 102 and a second portion 2021b that does not overlap with first substrate 102 in accordance with some embodiments. In some embodiments, the first portion 2021a of the second side surface 2021 is unprocessed and the second portion 2021b of the second side surface 2021 is processed.

On the other hand, the third side surface 3021 of the third substrate 302 also includes a first portion 3021a and a second portion 3021b in accordance with some embodiments. The fourth substrate 402 overlies the first portion 3021a but not the second portion 3021b. A portion of the fourth substrate 402 protrudes outward compared with the third substrate 302 (boundary of the third substrate 302). In some embodiments, the third side surface 3021 of the third substrate 302 includes defects C (not illustrated). In addition, the third side surface 3021 of the third substrate 302 is partially processed. More specifically, the first portion 3021a of the third side surface 3021 is unprocessed and the second portion 3021b of the third side surface 3021 is processed to reduce or remove the defects C. In other words, the third side surface 3021 of the third substrate 302 is at least partially unprocessed in accordance with some embodiments.

As described above, a portion of the fourth substrate 402 protrudes outward compared with the third substrate 302, and the fourth substrate 402 overlies the second portion 1021b of the first substrate 102 in accordance with some embodiments. In some embodiments, the fourth side surface 4021 of the fourth substrate 402 is processed since it protrudes outward compared with the third substrate 302.

As shown in FIG. 5A, after the electronic device 10 and the electronic device 20 are assembled, the processed second side surface 1022 of the first substrate 102 is adjacent to the partially unprocessed third side surface 3021 of the third substrate 302. In addition, the partially unprocessed second side surface 2021 of the second substrate 202 is adjacent to the processed fourth side surface 4021 of the fourth substrate 402. In such a configuration, the processed portion may be in contact with the unprocessed portion at the boundaries of the assembled substrates, and the space between the processed portion and the unprocessed portion may accommodate the particles or shards on the side surfaces of substrates. Therefore, the risk of cracks of the substrates may be reduced.

Figure 5B:
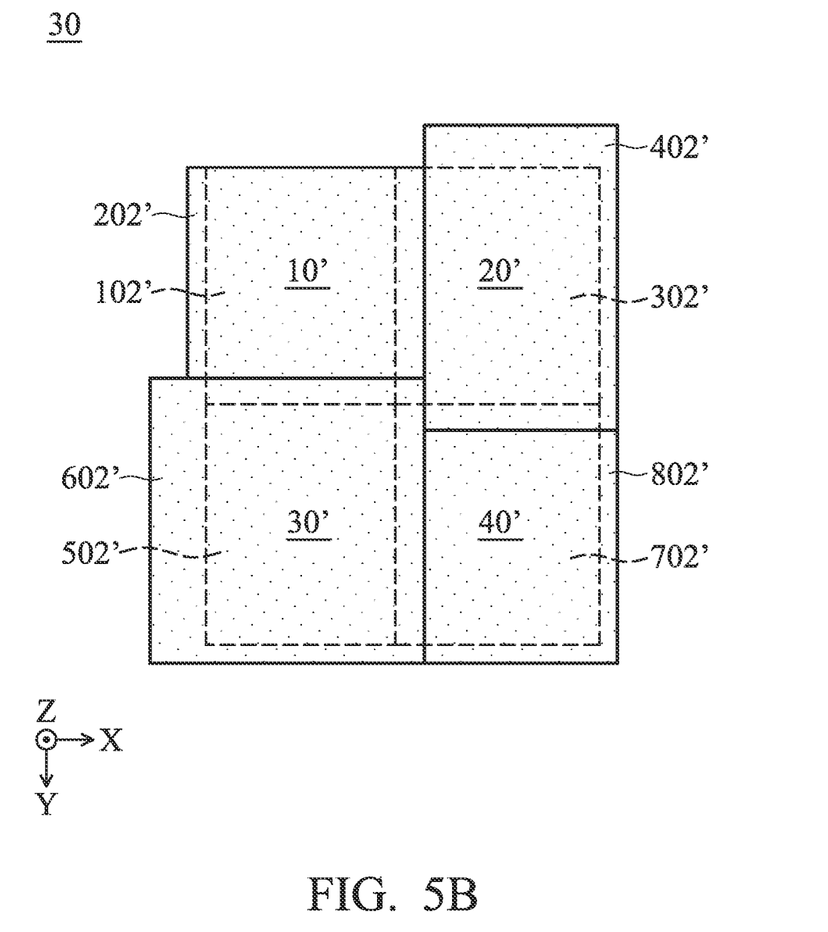
FIG. 5B is a diagram of the substrates of a tiled electronic device in accordance with some embodiments of the present disclosure.

Referring to FIG. 5B, FIG. 5B is a top-view diagram of the substrates of a tiled electronic device 30 in accordance with some embodiments. In accordance with some embodiments, the tiled electronic device may include a plurality of units. For example, as shown in FIG. 5B, the tiled electronic device 30 includes four units, i.e. an electronic device 10', an electronic device 20', an electronic device 30' and an electronic device 40'. In some embodiments, the electronic device 10', electronic device 20', electronic device 30' and electronic device 40' may be the same type of electronic device with the same function. In some embodiments, the electronic device 10', electronic device 20', electronic device 30' and electronic device 40' may be different types of electronic devices with various functions.

The electronic device 10' includes the first substrate 102' and the second substrate 202' disposed on the first substrate 102'. The electronic device 20' includes the third substrate 302' and the fourth substrate 402' disposed on the third substrate 302'. The electronic device 30' includes the fifth substrate 502' and the sixth substrate 602' disposed on the fifth substrate 502'. The electronic device 40' includes the seventh substrate 702' and the eighth substrate 802' disposed on the seventh substrate 702'.

The tiled electronic device 30 may include various arrangements of the assembled substrates. As shown in FIG. 5B, a portion of the side surface of the first substrate 102' overlaps the side surface of the second substrate 202' in the electronic device 10'. A portion of the side surface of the third substrate 302' is partially overlaid by the fourth substrate 402' in the electronic device 20'. All side surfaces of the fifth substrate 502' are overlaid by the sixth substrate 602' in the electronic device 30'. A portion of the side surface of the seventh substrate 702' is not overlaid by the eighth substrate 802' in the electronic device 40'.

In addition, some portions of the side surfaces of the first substrate 102' that are not overlaid by the second substrate 202', some portions of the side surfaces of the third substrate 302' that are not overlaid by the fourth substrate 402', and some portions of the side surfaces of the seventh substrate 702' that are not overlaid by the eighth substrate 802' are processed. Other portions of the side surfaces that are overlaid by the second substrate 202', the fourth substrate 402' or the eighth substrate 802' are unprocessed. Moreover, since the fifth substrate 502' are entirely overlaid by the sixth substrate 602' in the electronic device 30', the side surfaces of the fifth substrate 502' may be unprocessed.

Similarly, the processed portions may be in contact with the unprocessed portions at the boundaries of the assembled substrates, and the space between the processed portion and the unprocessed portion may accommodate the particles or shards on the side surfaces of substrates. Therefore, the risk of cracks of the substrates may be reduced, and the structural strength of the tiled electronic device 30 may be increased.

Referring to FIG. 6, FIG. 6 illustrates a cross-sectional view of an electronic device 40 in accordance with some embodiments of the present disclosure. In some embodiments, the electronic device 40 is a liquid-crystal molecule-modulating device such as a liquid-crystal display. The electronic device 40 includes the first substrate 102 and the second substrate 202 disposed opposite to the first substrate 102. The electronic device 40 further includes a liquid-crystal layer 310 disposed between the first substrate 102 and the second substrate 202, and enclosed by a sealing member 312.

The electronic device 40 may further include a driving layer (not illustrated) disposed on the first substrate 102, and a backlight unit 104 and a first polarizing structure 106 disposed below the first substrate 102. The driving layer may include thin-film transistors (TFT) or integrated circuits (IC).

The backlight unit 104 may include the light-emitting elements formed of quantum dot (QD) materials, fluorescence materials, phosphor materials, any other suitable light-emitting materials, or a combination thereof, but it is not limited thereto.

In some embodiments, the first polarizing structure 106 may be a general polarizer or replaced by a metal patterned layer such as a wire grid polarizer (WGP) between the two substrates or outside of the substrates.

Furthermore, as shown in FIG. 6, the electronic device 40 further includes a color conversion layer 204, a light-shielding element 208 formed of opaque materials such as a black matrix material, and a second polarizing structure 206. The color conversion layer 204 is disposed between the second substrate 202 and the liquid-crystal layer 310. The second polarizing structure 206 is disposed on the second substrate 202. The color conversion layer 204 may be disposed between light-shielding elements 208 to enhance the contrast of luminance in accordance with some embodiments.

Similarly, the first side surface 1021 of the first substrate 102 includes the first portion 1021a that is overlaid by the second substrate 202 and the second portion 1021b that is not overlaid by the second substrate 202. The second portion 1021b includes the processed region P (not shown in the perspective of FIG. 6).

Next, referring to FIG. 7, FIG. 7 illustrates a cross-sectional view of an electronic device 50 in accordance with some embodiments of the present disclosure. In should be understood that the same or similar components or elements in above and below contexts are represented by the same or similar reference numerals. The materials, manufacturing methods and functions of these components or elements are the same or similar to those described above, and thus will not be repeated herein.

In some embodiments, the electronic device 50 is a liquid-crystal molecule-modulating device such as an antenna device. The electronic device 50 includes the first substrate 102 and the second substrate 202 that is disposed opposite to the first substrate 102. The electronic device 50 further includes the liquid-crystal layer 310 and a plurality of spacers 314 disposed between the first substrate 102 and the second substrate 202. The liquid crystal layer 310 is disposed between the first substrate 102 and the second substrate 202 and enclosed by a sealing member 312.

The electronic device 50 includes a first element layer 110 disposed on the first substrate 102 and a second element layer 210 disposed on the second substrate 202. The first element layer 110 may include at least one slot or at least one microstrip line. The second element layer 210 may include at least one patch or a grounding layer with at least one hole. The patch or the hole corresponds to the slot or microstrip line. In some embodiment, the patch is outside of the second substrate 202 and corresponding to the hole. In some embodiment, the electronic device 50 further comprises a waveguide layer adjacent to the first substrate 102. The first element layer 110 and the second element layer 210 are electrically connected to driving circuit with thin film transistor or IC.

Similarly, the first side surface 1021 of the first substrate 102 includes the first portion 1021a that is overlaid by the second substrate 202 and the second portion 1021b that is not overlaid by the second substrate 202. The second portion 1021b includes the processed region P (not shown in the perspective of FIG. 7).

To summarize the above, the present disclosure provides an electronic device including the substrate that is partially processed. Specifically, the side surfaces of the substrate that are not overlaid by the opposite substrate are processed. The processing may prevent defects or cracks on the side surfaces of the substrate due to the cutting process from breaking. In such a configuration, the structural strength of the substrate may be enhanced. In addition, the partial processing of the side surfaces of the substrate may also reduce the manufacture cost. In embodiments where the substrates are tiled together, the contact of the partially processed side surfaces with the unprocessed side surfaces may also reduce the risk of cracks of the substrates.

Although some embodiments of the present disclosure and their advantages have been described in detail, it should be understood that various changes, substitutions and alterations can be made herein without departing from the spirit and scope of the disclosure as defined by the appended claims. For example, it will be readily understood by one of ordinary skill in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An electronic device, comprising:
a first substrate comprising a first portion;
a second substrate disposed on the first substrate, wherein the first portion protrudes outward a boundary of the second substrate in a direction perpendicular to a normal direction of the first substrate;
a third substrate disposed adjacent to the first substrate; and
a fourth substrate disposed on the third substrate and comprising a second portion protruding outward a boundary of the third substrate in a direction perpendicular to a normal direction of the third substrate, wherein the second portion overlaps the first portion,
wherein the first substrate comprises a first side surface faces to the third substrate and extends along a boundary of a top surface of the first substrate and a boundary of a bottom surface of the first substrate, the first side surface is not parallel to the top surface and the bottom surface, the fourth substrate comprises a second side surface faces the second substrate and extends along a boundary of a top surface of the fourth substrate and a boundary of a bottom surface of the fourth substrate, the second side surface is not parallel to the top surface and the bottom surface,
wherein the first side surface and the second side surface are at least partially grinded.

2. The electronic device as claimed in claim 1, wherein the first substrate and the third substrate are coplanar.

3. The electronic device as claimed in claim 1, wherein the second substrate and the fourth substrate are coplanar.

4. The electronic device as claimed in claim 1, further comprising a liquid-crystal layer disposed between the first substrate and the second substrate.

5. The electronic device as claimed in claim 1, wherein the first substrate further comprises a third portion and a fourth portion, the third portion is overlaid by the second substrate, the fourth portion is between the first portion and the third portion, and the fourth portion is not overlaid by the second substrate and is not grinded.

6. The electronic device as claimed in claim 5, wherein a length of the first portion is greater than a length of the fourth portion.

7. The electronic device as claimed in claim 5, wherein a length of the third portion is greater than a length of the first portion.

8. The electronic device as claimed in claim 5, wherein a surface roughness of the third portion is different from a surface roughness of the first portion.

9. The electronic device as claimed in claim 5, wherein a surface roughness of the fourth portion is different from a surface roughness of the first portion.

10. The electronic device as claimed in claim 1, wherein the first substrate further comprises a third side surface that is partially overlaid by the second substrate, and the third side surface is at least partially grinded.

11. The electronic device as claimed in claim 1, wherein the first substrate further comprises a third side surface that is partially overlaid by the second substrate, and the third side surface is partially coated with a protective material.

12. The electronic device as claimed in claim 1, wherein the third substrate comprises a fourth side surface that is partially overlaid by the fourth substrate.

13. The electronic device as claimed in claim 12, wherein the fourth side surface of the third substrate is at least partially grinded.

14. The electronic device as claimed in claim 12, wherein the fourth side surface of the third substrate is adjacent to the first side surface of the first substrate.

15. A method for manufacturing an electronic device, comprising:
    providing a first substrate, the first substrate comprising a first portion;
    forming a second substrate on the first substrate, wherein the first portion protrudes outward a boundary of the second substrate in a direction perpendicular to a normal direction of the first substrate;
    providing a third substrate adjacent to the first substrate;
    forming a fourth substrate on the third substrate, the fourth substrate comprising a second portion protruding outward a boundary of the third substrate in a direction perpendicular to a normal direction of the third substrate, wherein the second portion overlaps the first portion;
    wherein the first substrate comprises a first side surface faces the third substrate and extends along a boundary of a top surface of the first substrate and a boundary of a bottom surface of the first substrate, the first side surface is not parallel to the top surface and the bottom surface, the fourth substrate comprises a second side surface faces the second substrate and extends along a boundary of a top surface of the fourth substrate and a boundary of a bottom surface of the fourth substrate, the second side surface is not parallel to the top surface and the bottom surface; and
    at least partially grinding the first side surface and the second side surface.

16. The method for manufacturing an electronic device as claimed in claim 15, wherein the first substrate and the third substrate are coplanar.

17. The method for manufacturing an electronic device as claimed in claim 15, wherein the second substrate and the fourth substrate are coplanar.

18. The method for manufacturing an electronic device as claimed in claim 15, further comprising forming a liquid-crystal layer between the first substrate and the second substrate.

19. The method for manufacturing an electronic device as claimed in claim 15, wherein the first substrate further comprises a third side surface that is partially overlaid by the second substrate, and the third side surface is at least partially grinded.

20. The method for manufacturing an electronic device as claimed in claim 15, wherein a portion of the third side surface that is not overlaid by the second substrate is grinded.

* * * * *